ELECTRICAL GATING APPARATUS

Filed Dec. 7, 1959

INVENTORS
MOIZ B. KHAMBATY
WALTER STROHMEIER
BY Henry L. Hanson
ATTORNEY

3,174,137
ELECTRICAL GATING APPARATUS

Moiz B. Khambaty, Cambridge, and Walter Strohmeier, Newton Highlands, Mass., assignors to Honeywell Inc., a corporation of Delaware Filed Dec. 7, 1959, Ser. No. 857,881
6 Claims. (Cl. 340—174)

Figure 1:
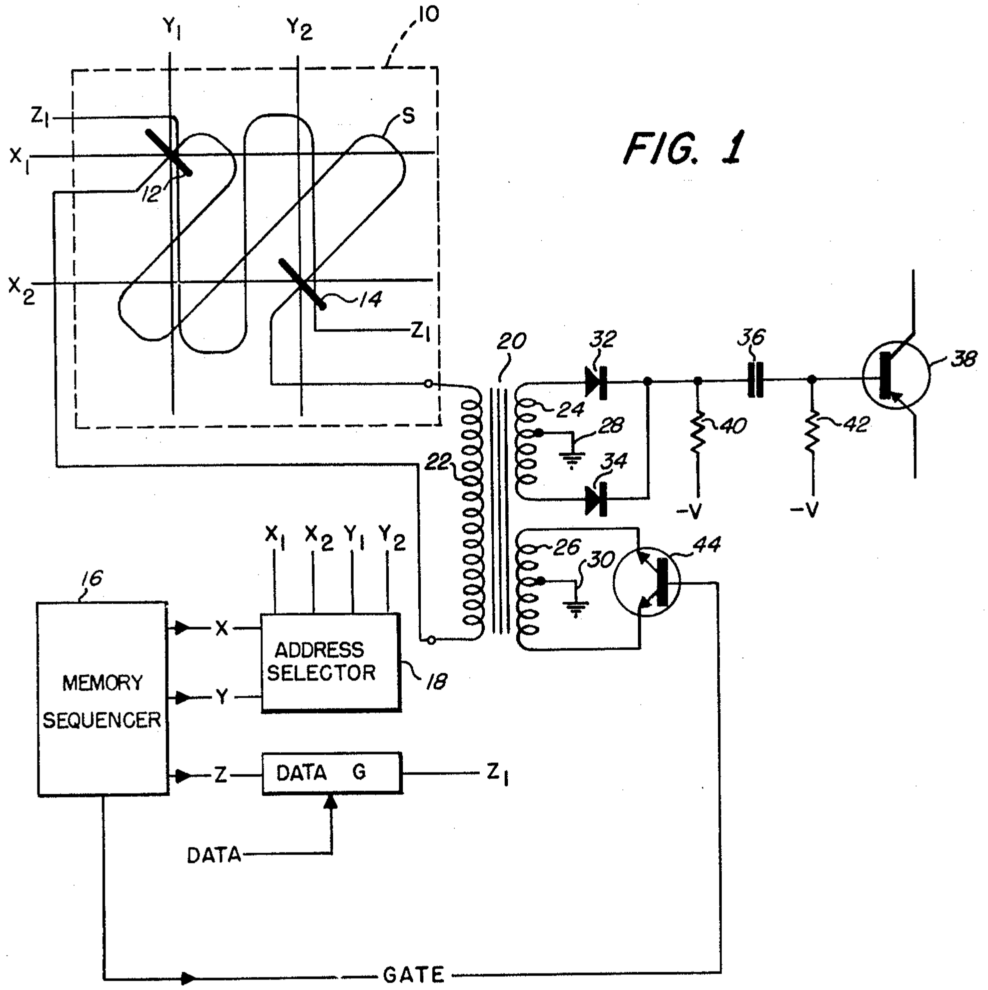

A general object of the present invention is to provide a new and improved apparatus for gating electrical signals. More specifically, the present invention is concerned with a new and improved apparatus for use with a coincident current memory sense winding wherein unwanted signals within the sense winding may be gated with respect to an output amplifying device in such a way that the time response of the circuit will not be impeded.

Coincident current memories are widely used in digital data processing apparatus for purposes of storing digital data. These coincident current memories comprise a plurality of rectangular hysteresis characteristic core elements arranged in a matrix with appropriate control and sense wires threaded therethrough for purposes of switching the cores from one bistable state to another and producing output signals in the sense windings in those instances when the associated core is switched. A coincident current memory of the type which may be used with the present invention is illustrated and described in the Forrester Patent 2,736,880, issued February 28, 1956.

In many coincident current memory circuits, the sense winding associated with the memory is coupled to an output transformer with the secondary winding of the transformer coupled to a suitable amplifying circuit. Inasmuch as the reading and writing effected within the memory is accomplished by way of the same matrix selection wires, the switching of a core in a writing or reading operation is effective to induce signals in the sense windings passing through the cores. Consequently, it is essential that there be provided gating means to ensure that any signal induced in the sense winding, in the course of a writing operation in the memory, not be passed to the output circuitry. In prior types of memory circuits, this gating has been accomplished by conventional electronic means associated with the amplifying device connected to the output of the output transformer. This has been adequate in those situations wherein the rate of operation, or speed of operation, of the memory has been sufficiently low that the transformer time constant or recovery characteristics would not affect the over-all operation of the circuit. With the advent of cores capable of switching at very high speeds, it has been found that the recovery time of the associated output transformer, following a write signal is sufficiently long that it adversely slows down the over-all cycle time of the associated memory circuit. In other words, once a write signal has been received in the memory, it is essential that the output transformer rapidly recover from this write signal prior to the time that the next memory readout takes place.

In accordance with the teachings of the present invention, there is provided a means for utilizing the transformer as a gating element in such a way that the time constant of the transformer will not have any appreciable effect on the timing of the over-all memory circuit.

It is, therefore, a further more specific object of the present invention to provide a new and improved gating circuit for the sense winding of a coincident current memory which comprises a gating transformer.

As taught by the present invention, the gating of the output transformer is effected by way of a short circuit condition created on the secondary winding. The short circuit condition on the secondary winding is reflected into the primary windings so as to cause the primary also to appear as a short circuit. The net effect of this is to remove the inductive time delay effects of the transformer and to condition the circuit so that once the short circuit is removed, the transformer is capable of responding substantially immediately to the desired signal on the primary winding.

Consequently, a further important object of the present invention is the provision of a gating circuit for the sense winding of a coincident current memory, and this gating circuit comprises a transformer having a secondary winding which is normally short-circuited except at the time that it is desired to pass a signal from the primary winding of the transformer through to an output utilization circuit.

Another object of the present invention is to provide a new and improved gating circuit as set forth above wherein the control switch is an electronic device which may well take the form of a symmetrically conductive transistor or a bilaterally conductive transistor for providing the desired short-circuit condition on the secondary of the transformer gating circuit.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 2:
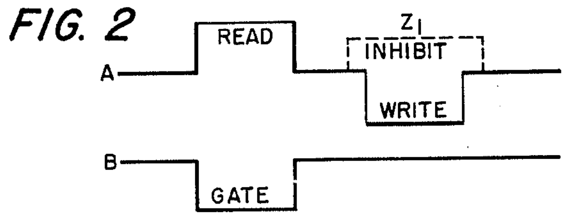

Of the drawings:

FIGURE 1 is a diagrammatic representation of one manner in which the present invention may be implemented; and FIGURE 2 illustrates representative wave forms that may be utilized in conjunction with the circuitry of FIGURE 1.

Referring first to FIGURE 1, the numeral 10 identifies a segment of a memory plane of a coincident current memory. The over-all memory may well take the form illustrated in the abovementioned Forrester patent. Within the plane 10 there are a plurality of core elements 12 and 14 which are adapted to be uniquely selected by way of the selection wires X and Y. The core 12, for example, is adapted to be selected by way of the selection wires $X_1$ and $Y_1$. The core 14, for example, is adapted to be selected by the selection wires $X_2$ and $Y_2$. An inhibit winding, designated as a winding $Z_1$, also threads both of the cores 12 and 14. Further, a sense winding S is adapted to thread all of the cores in the plane.

The control signals for the selection wires X and Y are derived from a suitable memory sequencer, indicated generally at 16. The sequencer is adapted to supply the X and Y signals to a suitable address selection matrix 18, the latter of which may receive its address signals either by way of manual switches or automatic control signals from a data processing system in a manner well known in the art. The inhibit signals for the $Z_1$ winding may also be derived from the memory sequencer and the application of an inhibit signal to a particular plane will be dependent upon the intended data input for the particular core selected.

The memory sequencer 16 is also adapted to provide a gating signal for use with the output of the memory plane so that it is possible to select only desired signals from the sense winding S in the memory 10.

The gating circuitry illustrated in FIGURE 1 comprises a transformer 20 having a primary winding 22 and a pair of secondary windings 24 and 26, the latter of which are center tapped at 28 and 30 respectively.

The secondary winding 24 is connected on its end terminals by way of a pair of diodes 32 and 34 to a coupling condenser 36, and then to an amplifying transistor 38. Suitable biasing voltages are provided by way of the biasing sources —V and their associated resistors 40 and 42.

The secondary winding 26 is coupled by its end terminals to the emitter-collector electrode circuit of symmetrically conducting, or bilaterally conducting, transistor 44. The transistor base terminal is connected to the gating signal source within the memory sequencer 16.

Considering the operation of the circuitry of FIGURE 1, reference should be made to the timing signals illustrated in FIGURE 2. Considering first the timing signals in FIGURE 2A, there is here illustrated the read signal and the write signal. When a read signal is applied to an X wire and a Y wire, for example, the wires $X_1$ and $Y_1$, if the associated core 12 has previously been set, the read signal will switch the core to the reset state. The switching of the core 12 will induce a signal in the sense wire S, and this will be applied to the primary winding 22 of the transformer 20. The signal on the primary is arranged to be coupled through the transformer 20 to the output transistor 38 for amplification.

After the reading operation has taken place, a write operation will take place. A write signal will accordingly be generated within the memory sequencer to have a negative polarity as indicated in FIGURE 2A, and this will be applied to the selected core which, as assumed above, is core 12. In the event that there is to be an inhibiting of the switching of the core 12, a data signal will be effective to open the data gate so that an inhibit signal $Z_1$ will be applied to the Z winding, or inhibit winding, of the core plane 10. The inhibit signal is a signal which has a magnitude equal to half of the select signal applied by way of the X and Y wires and the net current flowing in the selected core will be insufficient to switch the core into the set state.

It will be readily apparent that the application of the inhibit signals and the write signals to the wires threading the cores in the plane 10 will cause partial select signals and other noise signals which will be picked up by the sense wire S. The effect of this will be to apply these signals to the primary 22 and they will tend to pass on to the output transistor 38. Inasmuch as these unwanted signals must be gated out during a write operation, the gating is effected in the present invention by way of the transformer 20. Thus, normally, the secondary winding 26 which has the transistor 44 connected thereto will effectively act as a shorted winding on the transformer 20. In other words, the transistor 44 will normally have applied thereto a bias tending to switch the transistor into the conducting state. Since the transistor is connected on its output electrodes to the end terminals of the transformer winding 26, the transistor will be free to conduct independently of the direction of the signal appearing on the winding 26, and consequently the winding 26 will appear to be short-circuited. As long as the winding 26 appears as a short circuit, there is a reflection of this low impedance condition to the primary winding 22, and it likewise appears as a short circuit to signals originating within the sense winding S.

As soon as a read signal is to take place, the gating signal is applied to the transistor 44 so as to increase the impedance thereof or effectively open-circuit the switching action of the transistor. With the removal of the short circuit on the winding 26, the transformer 20 will be free to act in its normal manner to transmit the signal in the sense winding appearing on the winding 22 through to the winding 24 and thence to the output amplifying device 38. Immediately following the transfer of the readout signal, the transistor 44 is then again switched to the conducting state so that it is capable of short-circuiting the winding 26 in the event that any signal is induced on the winding 26 from the primary 22.

By utilizing the gating circuit in this manner, it will be readily apparent that the transformer characteristics which might otherwise be effectively acting during the writing operation are decoupled from the circuit so that the inductive and resistive impedances of the transformer will not adversely affect the rate at which reading and writing operations can take place. In other words, the recovery characteristics of the transformer 20 are effectively eliminated and the over-all combination may be operated at a relatively high repetition rate. In one embodiment of the present invention, it was found possible to operate the memory with a two-microsecond time for the reading operation and with the same time for the writing operation.

While the principles of the present invention have been described particularly in connection with a memory of the coincident current type, it will be readily apparent that the invention may be applied to other types of signal gating circuits.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and which it is desired to secure by Letters Patent is:

1. In combination, a coincident current memory means having a sense winding, a transformer having a primary winding coupled to said sense winding and secondary winding means connected to an output circuit, switch means connected to effectively short-circuit said secondary winding means, and means connected to open said switch means when data is to be read from said memory means.

2. In combination, a coincident current memory means having a sense winding, substantially no residual flux, said transformer including a transformer having a core with a primary winding coupled to said sense winding and secondary winding means connected to an output circuit, electronic switch means connected to effectively short-circuit said secondary winding means, and means connected to open said electronic switch means when data is to be read from said memory means so that a signal may pass through said secondary winding means to said output circuit.

3. In combination, a coincident current memory means having a sense winding, a transformer having a primary winding coupled to said sense winding and a first and second secondary winding, means connecting said first secondary winding to an output circuit, switch means connected to short-circuit said second secondary winding to block the transfer of data from said sense winding to said output circuit, and means connected to said switch means to open the latter when data is to be read from said memory means.

4. The combination as defined in claim 3 wherein said switch means comprises a symmetrically conducting transistor.

5. A signal gating means comprising a transformer having a primary winding adapted to be connected to a bipolar signal source, and secondary winding means adapted to be connected to a utilization circuit, a bilateral transistor switch means connected to said secondary winding means to effectively short-circuit said primary winding and thereby block the passage of signals of either polarity from said signal source, and means connected to said switch means to selectively increase the impedance of said switch means.

6. In combination, a coincident current memory means having a sense winding, a transformer having a core with a substantially linear hysteresis characteristic, said transformer including a primary winding and first and second secondary windings, each of said second secondary windings having a center tap, said sense winding being connected in shunt across said primary winding, an output amplifying device connected to said first secondary winding, and a switch connected to the ends of said second secondary winding, said switch being normally closed except when a signal is to be read from said sense winding.

References Cited by the Examiner

UNITED STATES PATENTS

| | | | |
|---|---|---|---|
| 2,719,773 | 10/55 | Karnaugh | 307—88 |
| 2,729,808 | 1/56 | Auerbach | 307—88 |
| 2,801,344 | 7/57 | Lubkin | 340—174 |
| 2,817,057 | 12/57 | Hollman | 323—60 |
| 2,902,608 | 9/59 | Shelman | 340—174 |
| 2,909,673 | 10/59 | Gunderson | 307—88 |
| 2,921,136 | 1/60 | Cooke | 340—174 |
| 2,926,298 | 2/60 | Newhouse | 323—50 |
| 2,937,285 | 5/60 | Olsen | 340—174 |

OTHER REFERENCES

Basic Magnetic Switching Circuits, by Durkee, Electric Manufacturing, October 1956, TKIE 37, pp. 102–106.

IRVING L. SRAGOW, *Primary Examiner.*